(12) United States Patent
Ionescu et al.

(10) Patent No.: US 10,050,984 B2
(45) Date of Patent: Aug. 14, 2018

(54) IDENTIFYING REQUESTS THAT INVALIDATE USER SESSIONS

(71) Applicant: International Business Machines Corporation, Armonk, NY (US)

(72) Inventors: Paul Ionescu, Kanata (CA); Iosif Viorel Onut, Kanata (CA); Ori Segal, Tel Aviv (IL); Wayne Duncan Smith, Kanata (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 231 days.

(21) Appl. No.: 13/711,970

(22) Filed: Dec. 12, 2012

(65) Prior Publication Data
US 2013/0160117 A1 Jun. 20, 2013

(30) Foreign Application Priority Data
Dec. 20, 2011 (CA) ..................... 2762544

(51) Int. Cl.
*G06F 21/57* (2013.01)
*H04L 29/06* (2006.01)
(Continued)

(52) U.S. Cl.
CPC ........ *H04L 63/1425* (2013.01); *G06F 11/368* (2013.01); *G06F 11/3668* (2013.01);
(Continued)

(58) Field of Classification Search
CPC ......... H04L 29/08576; H04L 29/08594; H04L 29/06319; H04L 29/06326;
(Continued)

(56) References Cited

U.S. PATENT DOCUMENTS 7,467,402 B2 * 12/2008 Pennington ............. H04L 63/10
726/5
7,546,630 B2 6/2009 Tabi
(Continued)

OTHER PUBLICATIONS

Mesbah et al., "Crawling AJAX-Based Web Applications through Dynamic Analysis of User Interface State Changes", 30 pages (Year: 2012).*
(Continued)

*Primary Examiner* — Thaddeus J Plecha
(74) *Attorney, Agent, or Firm* — Cuenot, Forsythe & Kim, LLC (57) ABSTRACT

An illustrative embodiment of a computer-implemented process for identifying a request invalidating a session excludes all marked logout requests of a Web application, crawls an identified next portion of the Web application and responsive to a determination, in one instance, that the state of the crawl is out of session, logs in to the Web application. The computer-implemented process further selects all crawl requests sent since a last time the crawl was in-session, excluding all marked logout requests and responsive to a determination that requests remain, crawls a selected next unprocessed request. Responsive to a determination, in the next instance, that state of the crawl is out of session and the selected request meets logout request criteria, the computer-implemented process marks the selected request as a logout request.

18 Claims, 6 Drawing Sheets

(51) Int. Cl.
*G06F 11/36* (2006.01)
*G06F 17/30* (2006.01)

(52) U.S. Cl.
CPC .... *G06F 11/3676* (2013.01); *G06F 17/30864* (2013.01); *G06F 21/577* (2013.01); *G06F 2221/033* (2013.01)

(58) Field of Classification Search
CPC ......... H04L 29/06353; H04L 29/08603; G06F 21/577; G06F 2221/033; G06F 11/3668; G06F 11/3676; G06F 11/368
USPC ..................................... 709/227–228; 726/22
See application file for complete search history.

(56) References Cited

U.S. PATENT DOCUMENTS

| | | | |
|---|---|---|---|
| 7,703,105 | B1 | 4/2010 | Chakraborty et al. |
| 7,975,296 | B2 | 7/2011 | Apfelbaum et al. |
| 2005/0193134 | A1* | 9/2005 | Syrjala ........................ 709/230 |
| 2006/0026286 | A1* | 2/2006 | Lei et al. ...................... 709/227 |
| 2006/0069671 | A1* | 3/2006 | Conley ............. G06F 17/30887 |
| 2007/0234409 | A1 | 10/2007 | Eisen |
| 2008/0040484 | A1* | 2/2008 | Yardley ................... H04L 67/02 709/227 |
| 2010/0180193 | A1* | 7/2010 | Jagdale ............... G06F 17/3089 715/234 |
| 2011/0161486 | A1 | 6/2011 | Podjarny et al. |
| 2012/0226813 | A1* | 9/2012 | Ragusa ................. G06F 9/5027 709/227 |
| 2013/0247204 | A1* | 9/2013 | Schrecker ........... H04L 45/306 726/25 |

OTHER PUBLICATIONS

Peine, H. et al., "Security Test Tools for Web Applications," [online] IESE Report No. 048.06/D, Fraunhofer IESE, Ver.1.1, Jan. 2, 2006, <http://www.wawaban.com/temp/Security-Checker-Tools-for-Web-Applications.pdf>, 200 pgs.

* cited by examiner

Identification system 300

FIG. 6 ofIDENTIFYING REQUESTS THAT
INVALIDATE USER SESSIONS

CROSS-REFERENCE TO RELATED
APPLICATIONS

This application claims the benefit of Canada Application Number 2762544 filed on Dec. 20, 2011, which is fully incorporated herein by reference.

BACKGROUND

When crawling a web application for a purpose of security testing, a capability of identifying links and requests, which when processed, log a user out of the web application is beneficial. One benefit typically realized is a reduced number of false positives and false negatives for security tests requiring knowledge of which requests are logout requests or security test requests requiring the application to be in a known state (for example, a logged in state or a logged out state) when sent. An example of this type of security test is when a session is not invalidated after logout.

Another benefit lies in improved crawl performance because a logout is performed deterministically rather than accidentally. Some applications require a user to be logged out before a subsequent login request will succeed, accordingly requiring knowledge of which requests are logout requests to successfully crawl these applications.

A challenge exists because logout pages, other than logout pages defined by the user, are difficult to identify. Additionally logout links, suspicious activity or specific actions that can logout the user automatically may exist however the user is not aware of the existence of these possibilities.

Current technologies for identification of logout pages typically rely on expert knowledge. For example, application scanners typically use regular expressions, however a regular expression method typically fails due to various reasons. Failures typically occur as a result of web pages written using a language other than English or using a different choice of words for a logout page that does not match the regular expression currently in use. A response is not always predictable because different pages of the application being examined may respond in different ways when a session is terminated including returning an error, invoking another process or page or cease processing.

Using the example of the application scanner, a capability to identify when the session is no longer valid may be present enabling the scanner to replay a login sequence to re-establish the session and continue scanning. In another example the application scanner may rely on sending a heartbeat request and expecting a corresponding pattern in a response to provide an indication of a valid session and therefore awareness of whether the scanner is logged in.

SUMMARY

According to one embodiment, a computer-implemented process for identifying a request invalidating a session excludes all marked logout requests of a Web application, identifies a next portion of the Web application, crawls the identified next portion of the Web application and determines, in one instance, whether a state of a crawl is out of session. Responsive to a determination, in one instance, that the state of the crawl is out of session, the computer-implemented process logs in to the Web application, selects all crawl requests sent since a last time the crawl was in-session, excluding all marked logout requests and determines whether any requests remain. Responsive to a determination that requests remain, the computer-implemented process further selects a next unprocessed request, crawls the selected next unprocessed request and determines whether, in a next instance, the state of the crawl is out of session. Responsive to a determination, in the next instance, that state of the crawl is out of session, the computer-implemented process determines whether the selected request meets logout request criteria and responsive to a determination that the selected request meets logout request criteria, marks the selected request as a logout request.

According to another embodiment, a computer program product for identifying a request invalidating a session comprises a computer recordable-type media containing computer executable program code stored thereon. The computer executable program code comprises computer executable program code for excluding all marked logout requests of a Web application, computer executable program code for identifying a next portion of the Web application, computer executable program code for crawling the identified next portion of the Web application, computer executable program code for determining, in one instance, whether a state of a crawl is out of session, computer executable program code responsive to a determination, in one instance, that the state of the crawl is out of session, for logging in to the Web application, computer executable program code for selecting all crawl requests sent since a last time the crawl was in-session, excluding all marked logout requests, computer executable program code for determining whether any requests remain, computer executable program code responsive to a determination that requests remain, for selecting a next unprocessed request, computer executable program code for crawling the selected next unprocessed request, computer executable program code for determining whether, in a next instance, the state of the crawl is out of session, computer executable program code responsive to a determination, in the next instance, that state of the crawl is out of session, for determining whether the selected request meets logout request criteria and computer executable program code responsive to a determination that the selected request meets logout request criteria, for marking the selected request as a logout request.

According to another embodiment, an apparatus for identifying a request invalidating a session comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to exclude all marked logout requests of a Web application, identify a next portion of the Web application, crawl the identified next portion of the Web application and determine, in one instance, whether a state of a crawl is out of session. The processor unit executes the computer executable program code responsive to a determination, in one instance, that the state of the crawl is out of session, to further direct the apparatus to log in to the Web application, select all crawl requests sent since a last time the crawl was in-session, excluding all marked logout requests, determine whether any requests remain and responsive to a determination that requests remain, select a next unprocessed request. The processor unit executes the computer executable program code to further direct the apparatus to crawl the selected next unprocessed request, determine whether, in a next instance, the state of the crawl is out of session and responsive to a determination, in the next instance, that state of the crawl is out of session, determine whether the selected request meets logout request criteria. Responsive to a determination that the selected request meets logout request criteria, the processor unit executes the computer executable program code to further direct the apparatus to mark the selected request as a logout request.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

This disclosure relates generally to in-session detection in a data processing system and more specifically to identification of requests causing a session invalid state in the data processing system.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
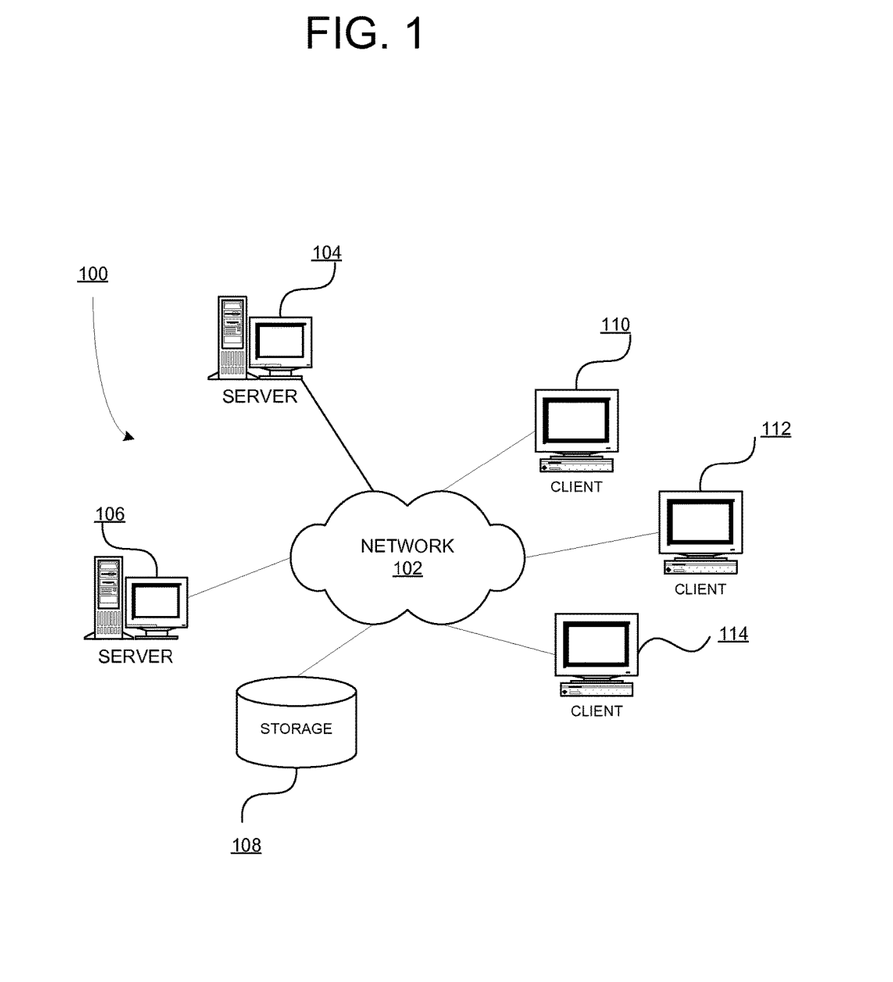
FIG. 1 is a block diagram of an exemplary network data processing system operable for various embodiments of the disclosure.
Figure 2:
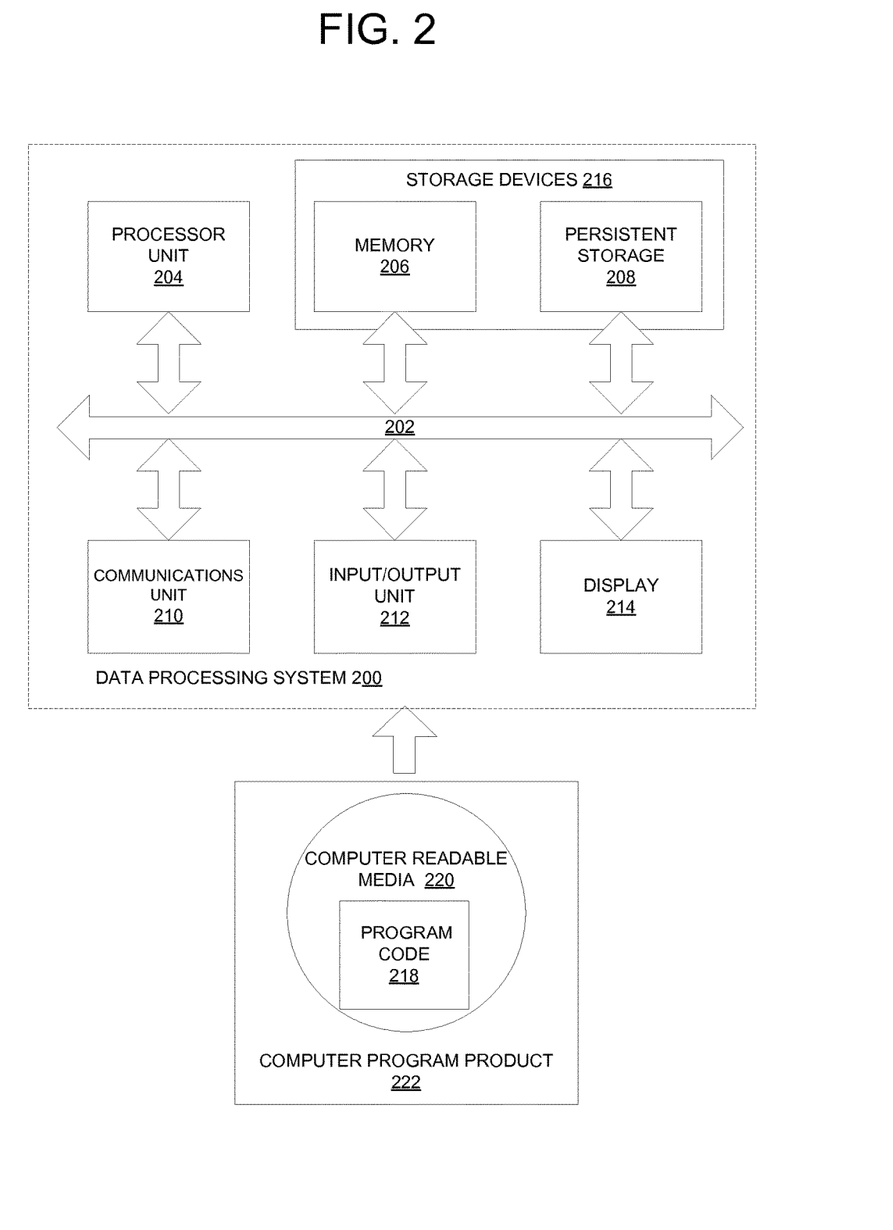
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for identifying a request invalidating a session is presented. Processor unit 204 excludes all marked logout requests of a Web application, identifies a next portion of the Web application maintained in storage devices 216, crawls the identified next portion of the Web application and determines, in one instance, whether a state of a crawl is out of session. Responsive to a determination, in one instance, that the state of the crawl is out of session, processor unit 204 logs in to the Web application, selects all crawl requests sent since a last time the crawl was in-session, excluding all marked logout requests and determines whether any requests remain. Responsive to a determination that requests remain, processor unit 204 further selects a next unprocessed request from storage devices 216, crawls the selected next unprocessed request and determines whether, in a next instance, the state of the crawl is out of session. Responsive to a determination, in the next instance, that state of the crawl is out of session, processor unit 204 determines whether the selected request meets logout request criteria maintained in storage devices 216 and responsive to a determination that the selected request meets logout request criteria, marks the selected request as a logout request.

Figure 3:
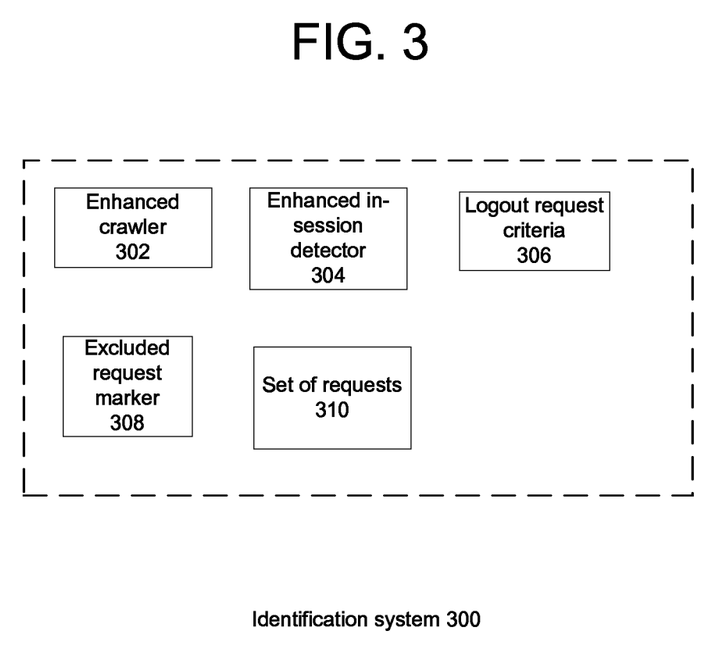
FIG. 3 is a block diagram of components of an identification system operable for various embodiments of the disclosure.

With reference to FIG. 3 a block diagram of components of an identification system operable for various embodiments of the disclosure is presented. Identification system 300 is an example of an embodiment of the disclosed request identification system used to identify requests that invalidate user sessions. User sessions may involve human users or other computing processes or devices representative of users.

Identification system 300 leverages underlying support of data processing systems such as those of data processing system 200 of FIG. 2 or network of data processing systems 100 of FIG. 1 for typical services and function support to obtain, send and store data. Identification system 300 comprises a number of components, which may be implemented as discrete functional elements, or some combination of components as needed in an installation without limiting effectiveness.

Identification system 300 includes functional components including enhanced crawler 302, enhanced in-session detector 304, logout request criteria 306, excluded request marker 308 and set of requests 310. Identification system 300 provides a capability to identify not only when a session changes state from being in-session to that of being out of session but also to identify a request causing the change in state and determining whether the request was a validated logout request.

Enhanced crawler 302 provides a capability to crawl pages of a Web application of interest to retrieve information. The enhancements provide a capability to recognize at which point in the crawl a session changes state and to exclude use of marked logout requests, which may interfere with the operation of the crawl. Enhanced crawler 302 also has a capability of selectively executing unprocessed requests identified since a last successful in-session state.

Enhanced in-session detector 304 provides a capability of identifying when a session of a crawler is invalidated by analyzing a response to a request received from a specified server. Enhanced in-session detector 304 also provides a capability to determine whether a request, identified upon occurrence of an out of session state, meets predetermined logout request criteria using logout request criteria 306. Enhanced in-session detector 304 further provides a capability of performing a login to establish a session after an out of session state is detected.

Logout request criteria 306 provide a set of conditions used to evaluate whether a specific request satisfies a predetermined definition of a request that invalidates a user session. Although the term logout request criteria is used, the term also encompasses other reasons for session invalidation because some requests may invalidate the session yet not cause the session to be explicitly logged out. Accordingly a logout request includes a request that invalidates a session whether the session is actually logged out or not.

In the example of the disclosure, usage of a hypertext transport protocol (HTTP) request is described by way of example only, however other types of requests including, for example, file transfer protocol (FTP) and simple mail transfer protocol (SMTP) requests may also be within the scope of the disclosed process. Logout request criteria 306 are defined to suit the specific protocol of the requests of interest, for example, the HTTP examples provided.

For example, a set of criteria may include mandatory criteria and a selection of one or more optional criteria. In an embodiment of the disclosure logout request criteria may be specified including mandatory criteria of the request being a crawl request (rather than a test request) and the request does not return an error code or a custom error page. Specification of selected criteria from among a set of optional criteria includes a requirement that the request satisfy at least one criterion of the request redirects to the application home page, the request redirects to the application login page, the request results in a session cookie value being changed, the request results in a session cookie being deleted and the request results in a request response including a script that modifies a session cookie value. Other conditional requirements, individually or in combinations, may be specified to further define selection criteria for specific invalidation situations as needed.

Excluded request marker 308 provides a capability to tag an identified request of an application as a logout request.

Marking of the identified request of an application as a logout request enables the scanning operation to avoid processing the request and accordingly encountering an out of session condition. Requests thus marked are identified programmatically using the criteria provided as logout request criteria 306. A mark may be provided directly to the identified request in the form of a machine-readable symbol or indirectly as a logically associated descriptor.

Set of requests 310 represents requests provided as input to the crawl process, typically one or more universal resource locators (URLs). The requests comprising set of requests 310 is predetermined prior to initiating a crawl process and further updated during the crawl using new requests identified. In another instance in which a login is initiated after session invalidation, set of requests 310 is updated using requests sent since a last time the crawl was in session. The requests comprising set of requests 310, excluding any marked logout requests, are submitted for subsequent processing after the crawl session is established.

Figure 4:
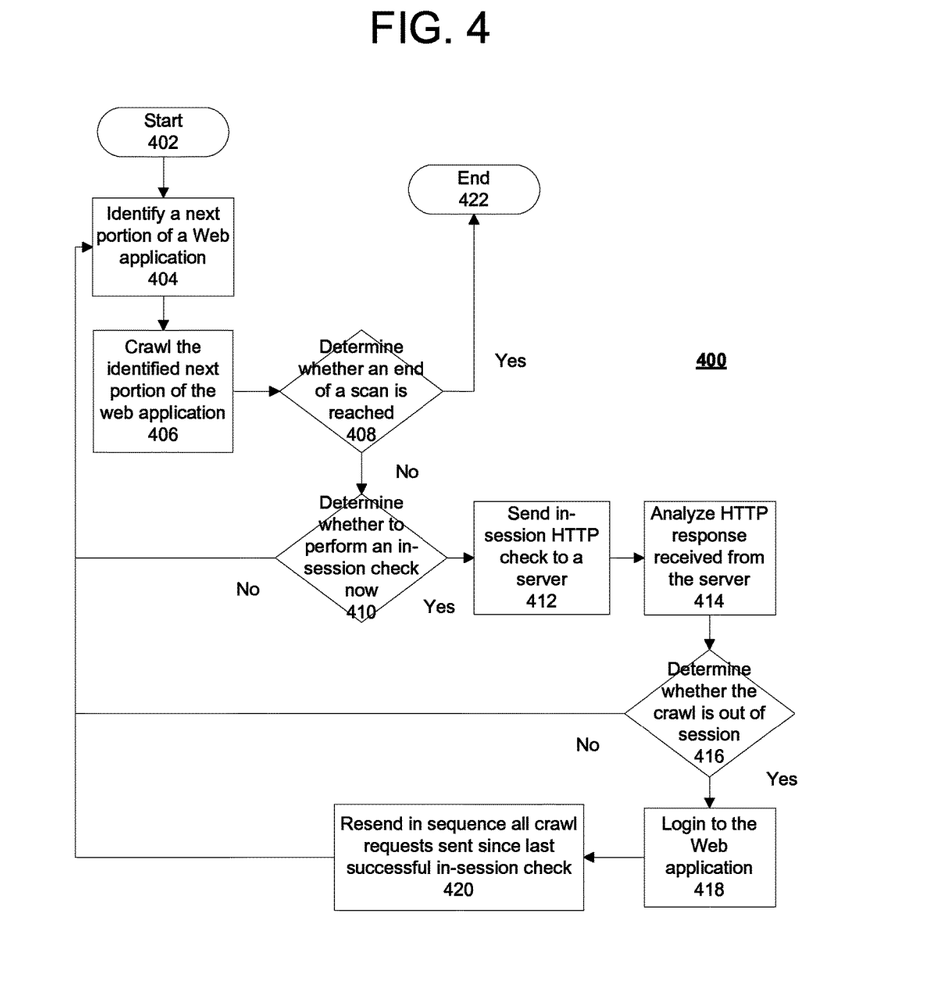
FIG. 4 a flowchart of an in-session detection process in accordance with one embodiment of the disclosure.

With reference to FIG. 4 a flowchart of an in-session detection process operable for various embodiments of the disclosure is presented. Process 400 is an example of monitoring a web crawler during processing of HTTP requests and determining whether a state of a web crawling session is in-session.

A technique known as in-session detection may be used to identify when a crawl process is no longer in session. An example of this type of technique is an automated login session extender (ALSE) for a Web application security scanner (WASS) available at http://www.freepatentsonline.com/7467402.html. When identification of an out of session state for the crawl is made, the technique of the example resends requests sent since a last successful identification of the crawl being in session. The requests are sent serially in a single thread for processing.

In this simple example, a series of requests forming a set of requests is submitted serially during a scan procedure. In the example using HTTP requests, pairs of requests are used in which a first request for data is followed by a highlighted second request, which tests the current state of the session as a result of issuing the first request of a pair. A sample set of requests is represented in the following example:

---

GET /index.jsp HTTP/1.1
GET /insessionpage HTTP/1.1. = In Session
GET /account.jsp HTTP/1.1
GET /insessionpage HTTP/1.1. = In Session
GET /logout.jsp HTTP/1.1
GET /insessionpage HTTP/1.1. = OUT OF SESSION (logout.jsp = Logout link)

---

Process 400 begins (step 402) and identifies a next portion of a Web application (step 404). For example, the next portion identified may be a universal resource locator (URL) request or a get request for an index as in the sample set of requests. Process 400 crawls the identified next portion of the Web application (step 406).

Process 400 determines whether an end of a scan is reached (step 408). Responsive to a determination that the end of the scan is reached, process 400 terminates (step 422). Responsive to a determination that the end of the scan is not reached, process 400 determines whether a time to perform an in-session check is reached (step 410). Setting a predetermined time interval after which an in-session check is performed establishes regular predictable intervals in which to identify session state changes.

Responsive to a determination that the time to perform an in-session check is not reached, process 400 loops back to perform step 404 as before. Responsive to a determination that the time to perform an in-session check is reached, process 400 sends an in-session hypertext transport protocol (HTTP) check to a server (step 412). The in-session HTTP check is sent to the server on which the Web application is being scanned. Process 400 analyzes a response received from the server (414). The response is generated by the server upon completion of the request for the in-session HTTP check and analysis typically includes a pattern matching exercise, using the response, with a predetermined pattern, such as in session.

Process 400 determines whether the crawl is out of session (step 416). Responsive to a determination that the crawl is not out of session, process 400 loops back to perform step 404 as before. Responsive to a determination that the crawl is out of session, process 400 performs a login to the Web application step (418). Because the analysis indicates the crawling procedure is in an out of session state, a procedure to log in to the application must be performed to establish the session and enable further scanning to occur.

Process 400 resends, in sequence, all crawl requests sent since a last successful in-session check result (step 420). This step is performed because requests were sent with an assumption the crawl was in session. The requests now need to be resent because at some point during processing the crawl went out of session. Sending all crawl requests sent since a last successful in-session check result enables crawling to be started at a point in processing of requests where the previous crawl was interrupted due to the out of session state.

Process 400 may optionally monitor session state after each request as in the sample set of requests in the current example, or check upon expiration of a predetermined interval as in step 410, or a combination of methods. Although process 400 is aware of a state change, such as out of session, process 400 does not explicitly identify a cause of the session state change.

Figure 5:
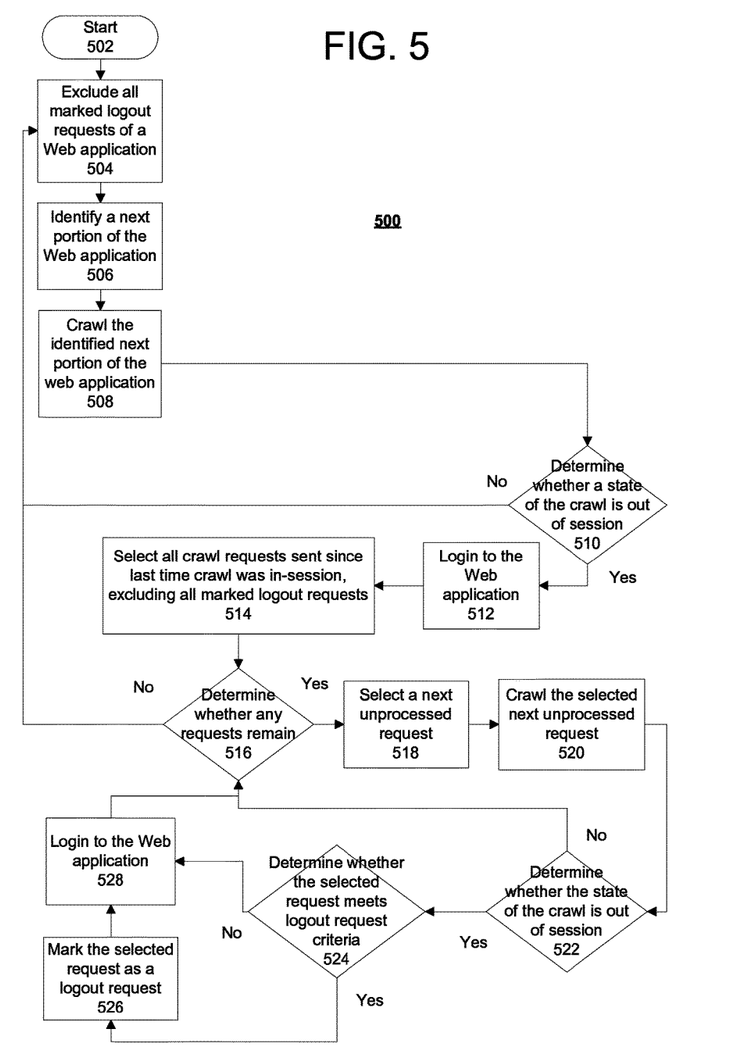
FIG. 5 is a flowchart of a simplified process for identifying a request invalidating a session using the identification system of FIG. 3 in accordance with one embodiment of the disclosure.

With reference to FIG. 5 a flowchart of a process for identifying a request invalidating a session operable for various embodiments of the disclosure is presented. Process 500 is an example of using identification system 300 of FIG. 3 and extending in-session detection process 400 of FIG. 4 to identify a request causing an out of session state change during a scanning operation.

Process 500, leverages in-session detection techniques such as in process 400 of FIG. 4, to determine which request from among a set of requests has caused an out of session state. After each request in the set of the requests is resent, the embodiment of the disclosure determines whether the application is in session or out of session. When out of session, that request is flagged as a candidate logout request and the application is logged into again. The embodiment of the disclosure then continues to the next request to be resent. An important consideration is the type of request. The type of request of interest is a non-mutated explore request rather than a security test type of request. Security type test requests typically have a potential to invalidate a session and accordingly are not reliable candidates for use in an embodiment of the disclosure.

Process 500 begins (step 502) and excludes all marked logout requests of a Web application (step 504). The marked logout requests, which may have been marked in a previous portion of a scan, are excluded to reduce known occurrences of out of session states. There may be an optional step in the scan, which when used is typically provided at the end of the scan to test logout requests using techniques specific to the logout requests.

Process 500 identifies a next portion of a Web application (step 506). For example, the next portion identified may be a universal resource locator (URL) request or a get request for an index as in the sample set of requests. Process 500 crawls the identified next portion of the Web application (step 508).

Process 500 determines whether the crawl is out of session (step 510). Responsive to a determination that the crawl is not out of session, process 500 loops back to perform step 504 as before. Responsive to a determination that the crawl is out of session, process 500 performs a login to the Web application (step 512). Because the analysis indicates the crawling procedure is in an out of session state, a procedure to log in to the application must be performed to establish the session and enable further scanning to occur.

Process 500 selects all crawl requests sent since a last time the crawl was in-session, excluding all marked logout requests (step 514). All marked requests in the set of requests are excluded to reduce scan time and prevent unnecessary changes to an out of session state. Process 500 determines whether any requests remain (step 516).

Responsive to a determination that requests do not remain, process 500 loops back to perform step 504 as before. Responsive to a determination that requests remain, process 500 selects a next un-processed request (step 518) and crawls the selected next un-processed request (step 520).

Process 500 determines whether the crawl is out of session (step 522). Responsive to a determination that the crawl is not out of session, process 500 loops back to perform step 516 as before. Responsive to a determination that the crawl is out of session, process 500 determines whether the selected request meets logout request criteria (step 524). Responsive to a determination that the selected request meets logout request criteria, process 500 marks the selected request as a logout request (step 526). The logout request criteria are typically predefined using a data structure associated with the scanner wherein the data is obtained from some form of persistent storage such as a database, configuration file or properties file. For example, a user interface associated with the scanner is provided enabling the user to customize the logout request criteria. The user interface provides a capability to define the criteria and store the definitions into some form of persistent storage such as a database, configuration file or properties file.

Process 500 performs a login to the Web application (step 528). The login establishes an in-session state again. Responsive to a determination that the selected request does not meet logout request criteria, process 500 performs step 528 as previously stated.

Figure 6:
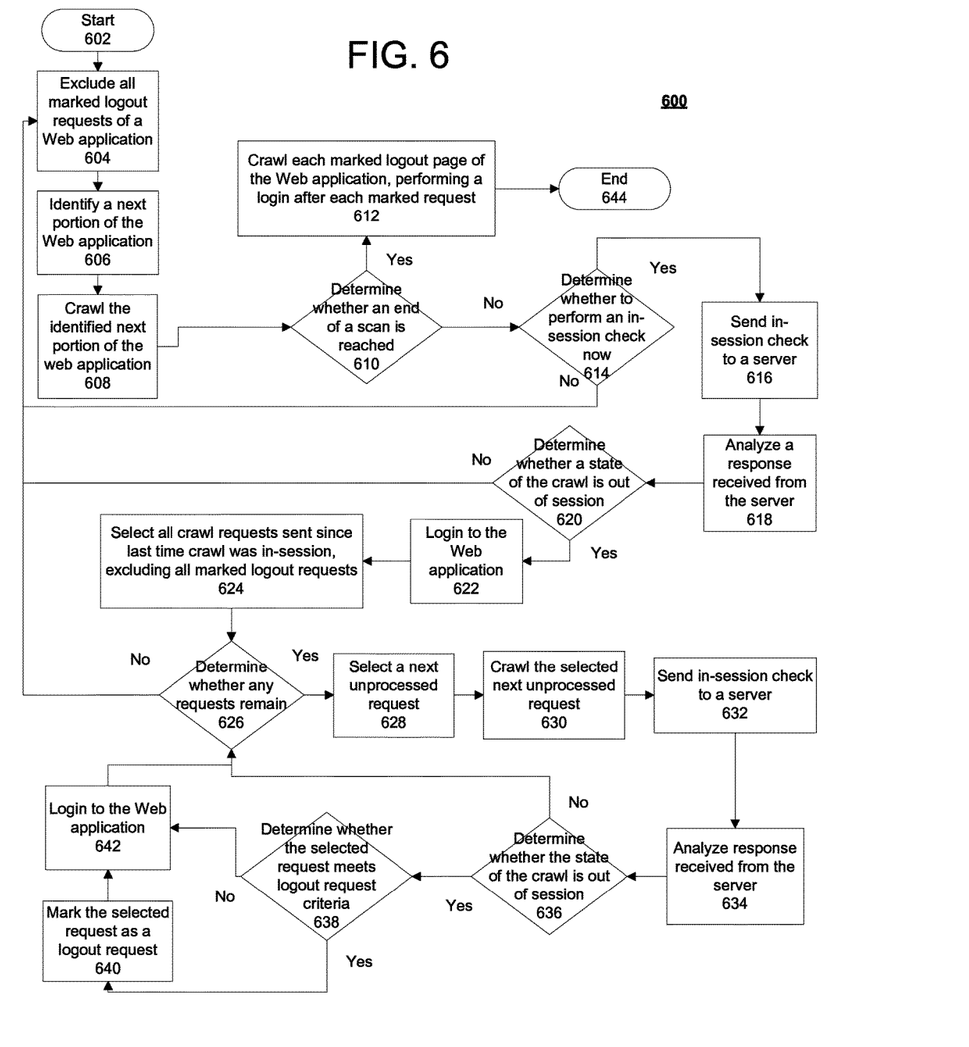
FIG. 6 is a flowchart of a detailed process for identifying a request invalidating a session using the identification system of FIG. 3 operable for various embodiments of the disclosure.

With reference to FIG. 6 a flowchart of a process for identifying a request invalidating a session operable for various embodiments of the disclosure is presented. Process 600 is a further example of a detailed view of process 500 of FIG. 5.

Process 600 begins (step 602) and excludes all marked logout requests of a Web application (step 604). The marked logout requests, which may have been marked in a previous portion of a scan, are excluded to reduce known occurrences of out of session states. Process 600 identifies a next portion of a Web application (step 606). For example, the next portion identified may be a universal resource locator (URL) request or a get request for an index as in the sample set of requests. Process 600 crawls the identified next portion of the Web application (step 608).

Process 600 determines whether an end of a scan is reached (step 610). Responsive to a determination that the end of the scan is reached, process 600 crawls each marked logout request of the Web application, performing a login after each marked request (step 612) and terminates thereafter (step 644). Responsive to a determination that the end of the scan is not reached, process 600 determines whether a time to perform an in-session check is reached (step 614). Setting a predetermined time interval after which an in-session check is performed establishes regular predictable intervals in which to identify session state changes.

Responsive to a determination that the time to perform an in-session check is not reached, process 600 loops back to perform step 604 as before. Responsive to a determination to perform an in-session check now, process 600 sends an in-session check request to a server (step 616). The in-session check is sent to the server on which the Web application is being scanned. For example, when using HTTP an in-session check can be a hypertext transport protocol (HTTP) in-session check request. Process 600 analyzes an HTTP response received from the server (step 618). The response is generated by the server upon completion of the in-session check request for the in-session check and analysis typically includes a pattern matching exercise, using the response, with a predetermined pattern, such as in session.

Process 600 determines whether the crawl is out of session (step 620). Responsive to a determination that the crawl is not out of session, process 600 loops back to perform step 604 as before. Responsive to a determination that the crawl is out of session, process 600 performs a login to the Web application (step 622). Because the analysis indicates the crawling procedure is in an out of session state, a procedure to log in to the application must be performed to establish the session and enable further scanning to occur.

Process 600 selects all crawl requests sent since a last time the crawl was in-session, excluding all marked logout requests (step 624). All marked requests in the set of requests are excluded to reduce scan time and prevent unnecessary changes to an out of session state. Process 600 determines whether any requests remain (step 626).

Responsive to a determination that requests do not remain, process 600 loops back to perform step 604 as before. Responsive to a determination that requests remain, process 600 selects a next un-processed request (step 628) and crawls the selected next un-processed request (step 630).

Process 600 sends an in-session check request to the server (step 632). Process 600 analyzes the response, associated with the in-session check, received from the server, as before (step 634).

Process 600 determines whether the crawl is out of session (step 636). Responsive to a determination that the crawl is not out of session, process 600 loops back to perform step 626 as before. Responsive to a determination that the crawl is out of session, process 600 determines whether the selected request meets logout request criteria (step 638). Responsive to a determination that the selected request meets logout request criteria, process 600 marks the selected request as a logout request (step 640). The logout request criteria are typically predefined using a data structure associated with the scanner wherein the data is obtained from one of a configuration file, a property file and a database. Process 600 performs a login to the Web application (step 642). The login establishes an in-session state again. Responsive to a determination that the selected request does not meet logout request criteria, process 600 performs step 642 as previously stated.

Thus is presented in an illustrative embodiment a computer-implemented process for identifying a request invalidating a session. The computer-implemented process excludes all marked logout requests of a Web application, crawls an identified next portion of the Web application and responsive to a determination, in one instance, that the state of the crawl is out of session, logs in to the Web application. The computer-implemented process further selects all crawl requests sent since a last time the crawl was in-session, excluding all marked logout requests and responsive to a determination that requests remain, crawls a selected next unprocessed request. Responsive to a determination, in the next instance, that state of the crawl is out of session and the selected request meets logout request criteria, the computer-implemented process marks the selected request as a logout request.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented method for performing a crawl of a Web application, comprising:
   first determining that a state of the crawl is out of session;
   identifying, based upon the first determining, a last time the crawl was in session;
   first logging, based upon the first determining, into the Web application to establish that the state of the crawl is in session;
   identifying, based upon the first determining, a first set of requests including only those crawl requests sent since the last time the crawl was in session;
   selecting, from the first set of requests, a next unprocessed crawl request;
   executing the selected next unprocessed crawl request; and
   second determining, after the executing, that the state of the crawl is out of session;
   marking, as a logout request and based upon the second determining, the selected next unprocessed crawl request, wherein
   the first set of requests, from which the next unprocessed crawl request is selected, excludes all crawl requests previously marked as a logout request, and
   a crawl request marked as a logout request is a request sent to the Web Application that invalidates a user session with the Web application.

2. The method of claim 1, wherein
   the marking the selected next unprocessed crawl request as a logout request is based upon the next unprocessed crawl request not returning an error message from the Web application.

3. The method of claim 1, wherein
   the marking the selected next unprocessed crawl request as a logout request is based upon the next unprocessed crawl request meeting both a mandatory criteria and a selected optional criteria.

4. The method of claim 1, wherein
a determination that the state of the crawl is out of session includes:
  sending an in-session check request to a server; and
  analyzing a response, associated with the in-session check request, received from the server.
5. The method of claim 1, further comprising:
second logging, based upon the second determining, into the Web application to establish that the state of the crawl is in session;
selecting, from the first set of requests and after the second logging, a second next unprocessed crawl request; and
executing the selected second next unprocessed crawl request.
6. The method of claim 1, wherein
the marking is performed:
  directly using a machine-readable symbol, or
  indirectly using a logically associated descriptor.
7. A computer hardware system configured to perform a crawl of a Web application, comprising:
  a hardware processor configured to initiate the following executable operations:
    first determining that a state of the crawl is out of session;
    identifying, based upon the first determining, a last time the crawl was in session;
    first logging, based upon the first determining, into the Web application to establish that the state of the crawl is in session;
    identifying, based upon the first determining, a first set of requests including only those crawl requests sent since the last time the crawl was in session;
    selecting, from the first set of requests, a next unprocessed crawl request;
    executing the selected next unprocessed crawl request;
    second determining, after the executing, that the state of the crawl is out of session; and
    marking, as a logout request and based upon the second determining, the selected next unprocessed crawl request, wherein
  the first set of requests, from which the next unprocessed crawl request is selected, excludes all crawl requests previously marked as a logout request, and
  a crawl request marked as a logout request is a request sent to the Web Application that invalidates a user session with the Web application.
8. The system of claim 7, wherein
the marking the selected next unprocessed crawl request as a logout request is based upon the next unprocessed crawl request not returning an error message from the Web application.
9. The system of claim 7, wherein
the marking the selected next unprocessed crawl request as a logout request is based upon the next unprocessed crawl request meeting both a mandatory criteria and a selected optional criteria.
10. The system of claim 7, wherein
a determination that the state of the crawl is out of session includes:
  sending an in-session check request to a server; and
  analyzing a response, associated with the in-session check request, received from the server.
11. The system of claim 7, wherein the hardware processor is further configured to initiate the following executable operations:
  second logging, based upon the second determining, into the Web application to establish that the state of the crawl is in session;
  selecting, from the first set of requests and after the second logging, a second next unprocessed crawl request; and
  executing the selected second next unprocessed crawl request.
12. The system of claim 7, wherein
the marking is performed:
  directly using a machine-readable symbol, or
  indirectly using a logically associated descriptor.
13. A computer program product, comprising:
  a hardware storage device having stored therein computer executable program code for performing a crawl of a Web application,
  the computer executable program code, which when executed by a computer hardware system, causes the computer hardware system to perform:
    first determining that a state of the crawl is out of session;
    identifying, based upon the first determining, a last time the crawl was in session;
    first logging, based upon the first determining, into the Web application to establish that the state of the crawl is in session;
    identifying, based upon the first determining, a first set of requests including only those crawl requests sent since the last time the crawl was in session;
    selecting, from the first set of requests, a next unprocessed crawl request;
    executing the selected next unprocessed crawl request;
    second determining, after the executing, that the state of the crawl is out of session; and
    marking, as a logout request and based upon the second determining, the selected next unprocessed crawl request, wherein
  the first set of requests, from which the next unprocessed crawl request is selected, excludes all crawl requests previously marked as a logout request, and
  a crawl request marked as a logout request is a request sent to the Web Application that invalidates a user session with the Web application.
14. The computer program product of claim 13, wherein
the marking the selected next unprocessed crawl request as a logout request is based upon the next unprocessed crawl request not returning an error message from the Web application.
15. The computer program product of claim 13, wherein
the marking the selected next unprocessed crawl request as a logout request is based upon the next unprocessed crawl request meeting both a mandatory criteria and a selected optional criteria.
16. The computer program product of claim 13, wherein
a determination that the state of the crawl is out of session includes:
  sending an in-session check request to a server; and
  analyzing a response, associated with the in-session check request, received from the server.
17. The computer program product of claim 13, wherein
the computer executable program code further causes the computer hardware system to perform:
  second logging, based upon the second determining, into the Web application to establish that the state of the crawl is in session;

selecting, from the first set of requests and after the second logging, a second next unprocessed crawl request; and executing the selected second next unprocessed crawl request.

18. The computer program product of claim 13, wherein the marking is performed:
   directly using a machine-readable symbol, or
   indirectly using a logically associated descriptor.

* * * * *